United States Patent [19]
Motley et al.

[11] 3,820,602
[45] June 28, 1974

[54] USE OF A SPACER COMPOSITION IN WELL CEMENTING

[75] Inventors: Herman R. Motley, Tulsa; Earl F. Morris, Wagoner, both of Okla.; Joseph P. Pavlich, Houston, Tex.

[73] Assignee: The Dow Chemical Company, Midland, Mich.

[22] Filed: June 12, 1973

[21] Appl. No.: 369,365

Related U.S. Application Data

[63] Continuation of Ser. No. 172,304, Aug. 16, 1971, abandoned.

[52] U.S. Cl. ............................... 166/291
[51] Int. Cl. .................. E21b 21/00, E21b 33/14
[58] Field of Search .................. 166/291, 285, 292; 252/8.5 P

[56] References Cited
UNITED STATES PATENTS

| | | | |
|---|---|---|---|
| 2,661,334 | 12/1953 | Lummus | 252/8.5 P |
| 2,848,051 | 8/1958 | Williams | 166/291 |
| 3,625,286 | 12/1971 | Parker | 166/291 |
| 3,634,235 | 1/1972 | Wilson et al. | 252/8.5 P X |
| 3,642,623 | 2/1972 | Bennett et al. | 252/8.5 P X |
| 3,688,845 | 9/1972 | Messenger | 166/291 |

*Primary Examiner*—Stephen J. Novosad
*Attorney, Agent, or Firm*—Bruce M. Kanuch

[57] ABSTRACT

A flowable composition is provided which can be employed as a spacer to separate particulate solid containing carbonaceous and aqueous fluids which are contained in or flowing through a container or conduit. The flowable composition comprises a liquid hydrocarbon base with both an oil wetting and water wetting surfactant dispersed therein.

6 Claims, No Drawings

3,820,602

USE OF A SPACER COMPOSITION IN WELL CEMENTING

CROSS-REFERENCE TO RELATED APPLICATION

This is a continuation, of application Ser. No. 172,304 filed Aug. 16, 1971, now abandoned.

BACKGROUND OF THE INVENTION

It is often desirable to separate or prevent contact between particulate solid containing carbonaceous and aqueous liquids. For example, drilling fluids (muds) are normally present in oil and other similar wells at the time of cementing a casing into a borehole with an aqueous cement slurry. The mud and cement are not always compatible with each other. The incompatibility of an aqueous cement slurry with an oil or water based mud can be of such severity that a mixture of the two will form an unpumpable mass. When this happens in a borehole, the cement slurry cannot be pumped or displaced. Casing, tubing or drill pipe will be left full of set cement which require costly drilling out or in some cases develops into a situation that cannot be corrected. In the latter instance, a costly oil, or other similar well, may have to be abandoned.

One procedure for removing the mud is to merely attempt to displace it with the cement slurry. However, as indicated, this is not always possible. It is necessary to achieve good mud removal ahead of the cement to obtain good bonding between the set cement, the borehole wall and the casing.

A limited attempt has been made to interpose a liquid spacer composition between a cement slurry and mud to improve mud displacement. The use of water or oil ahead of the cement slurry has been a common practice for many years. It is primarily thought of as a flushing agent and a means for physically separating the mud and the cement slurry. However, tests have shown that most of the mud cake retained on the borehole wall cannot be removed under normal circulating conditions. Similarly, chemical washes have not been completely successful in removing mud from the formation face.

To be effective, the spacer composition should have the following characteristics. The spacer should be compatible with both a carbonaceous and aqueous media, e.g., a drilling mud and an aqueous cement slurry and with any combination of the three systems. This compatibility should also exist at high temperatures and under elevated pressures. The liquid spacer should also be able to remove tenacious mud which clings to casing pipe and face of the formation. It is also desirable to leave these surfaces water wet so that the aqueous cement can firmly bond to the pipe and the formation. The liquid spacer should also be readily adaptable to a wide variety of aqueous and carbonaceous systems, e.g., muds and cement slurries. Likewise, the density of the spacer composition should be readily variable in order to match the densities of the fluids to be removed from a well, etc.

The present invention concerns a liquid spacer composition which successfully accomplishes most of the desired characteristics set forth above. It can also be employed as a spacer, for example, in pipe lines, between hydrocarbonaceous and nonhydrocarbonaceous fluids.

SUMMARY OF THE INVENTION

The present invention concerns a liquid composition. The invention also concerns a method for preventing substantial contact between noncompatible liquids contained in a conduit or container by employing the composition as a spacer.

The composition comprises a liquid hydrocarbon base, a water setting surfactant and an oil wetting surfactant.

The two surfactants are individually employed in an amount to make the liquid composition compatible with both of the solid containing carbonaceous and aqueous fluids, e.g., drilling muds, aqueous cement slurries, etc., and various combinations thereof and desirably to render the surfaces of the conduit water wettable. Optionally, a suspending agent, weighting agent and/or other additive can be incorporated into the composition.

In removing mud from a borehole, the liquid composition of this invention is pumped down the borehole and up through the annulus between the casing and the formation face to remove the drilling mud therefrom. The liquid composition of this invention may be forced down the casing and up through the annulus by the use of another liquid, but preferably it is immediately followed by the aqueous cement slurry to be employed to cement the casing.

Sufficient spacer is employed to separate the drilling mud from the cement slurry. As the spacer is circulated through the wellbore, it will mix with oilbased mud and the cement slurry will mix with the spacer. Before the drilling mud is completely removed from the wellbore, there may be mixing of the drilling mud, spacer and cement slurry. However, the composition of the present invention will not set up or otherwise become immobile because of a commingling of the three components.

DETAILED DESCRIPTION OF THE INVENTION

The spacer composition comprises a liquid hydrocarbon base. Generally, any mineral oil such as those commonly employed in oil base drilling muds may be employed. Illustrative of such oils are diesel and fuel oils, naphtha, hexane, pentane, benzene, toluene, kerosene, heavy or light lubricating oils, petroleum fractions and other similar oils. Lighter hydrocarbon liquids which tend to thin a hydrocarbon based mud are beneficial in facilitating mud removal.

An essential ingredient of the composition is a water wetting surfactant, i.e., a surfactant which renders surfaces susceptible to be wet by water. The surfactant need not be soluble in the mineral oil base but may be suspended therein in a powdered or liquid form. It has been found preferable to employ water wetting surfactants which are oil insoluble. Illustrative of water wetting surfactants are fatty nitrogen ether carboxylates, laurylbentane, stearic acid ester of N,N-diethylethanolamine, stereoamide of N,N-dimethylpropylenediamine, alkali metal salts of N-cocoamino euteric acid, the amphoteric product of primary cocoamine and crotonic acid, cetyl palmiticacryolamide, natural lecithin, refined lecithins and suitable carriers such as coco butter, carbitol, etc., the sodium salt of N-cocobetaaminopropionate, N-cocobetaaminopropionate acid, the disodium salt of N-talobetaaminotripropionate, the disodium N-laurylbetaiminodipropionate, the partial sodium salt of N- laurylbetaiminodipropionate, triethanolamine salt of N-laurylbetaiminopropionic acid, N-laurylmyristylbetaiminopropionic acid and other similar amphoteric surfactants. It is appreciated that certain water wetting surfactants may not be compatible with the hydrocarbon base of the composition, with a specific drilling mud composition, or an aqueous cement slurry. Therefore, in a particular siutation the compatibility of the water wetting surfactant should first be determined by simple laboratory tests. Likewise, the effective amount of an individual water wetting surfactant in the composition may vary depending on the surfactant, the temperature of use and other parameters. The water wetting surfactant should be employed in an amount which is effective to render the liquid spacer composition compatible with the aqueous fluid, e.g., an aqueous cement slurry and to render the mixture of liquid spacer and cement slurry compatible with the carbonaceous fluid, e.g., drilling mud, or mixtures of drilling mud and liquid spacer, to be encountered in the specific use. Similarly, in certain instances certain water wetting surfactants may be compatible with the various compositions when maintained below a certain maximum amount. This can also be determined by simple laboratory tests.

The second essential constituent of the spacer composition is an oil wetting surfactant, i.e., one characterized as providing surface active properties when dispersed in a liquid hydrocarbon. This surfactant improves the solvency characteristics of the mineral oil base to aid in removing carbonaceous materials, e.g., oilbased drilling muds, from the walls and surfaces of the conduit, e.g., casing and formation surfaces. As with the water wetting surfactant the compatibility of an individual oil wetting surfactant should be determined prior to its use in any particular formulation. Secondly, the maximum amount which is compatible should also be determined. Also it has been found preferable to employ oil wetting surfactants which are substantially insoluble in water. Reference may be made to U.S. Pat. No. 3,537,524, column 2, lines 38–63, for examples of oil wetting surfactants useful in the present invention. Specific surfactants which can be employed include, for example, substituted oxazoline, complex amine salts, heterocyclic tertiary amine, stearyl dimethyl benzyl ammonium chloride, alkyl dimethyl benzyl ammonium chloride, fatty amide type, fatty amine condensate, quaternary methylol amide, substituted imidozoline of saturated and unsaturated fatty acids, fatty nitrogen complex, fatty alkanolamide, bis(tridecyl) ester of sodium sulfosuccinic acid, alkylphenol ethoxylate, condensation product of ethylene oxide and an alkyl phenol, polyglycerol ester of a fatty acid, amine salt of an alkyl aryl sulfonate, complex organic ester of phosphoric acid, ethoxylated cetyl/stearyl alcohol, and calcium alkyl aryl sulfonate.

The water and oil wetting surfactants are used in such a balance, e.g., in a certain weight ratio, so that the water to solids ratio of, for example, a cement slurry, and the oil to solids ratio of, for example, a drilling mud will not be substantially altered when they are commingled with the spacer composition. By providing both of these surfactants water wet solids in the aqueous liquid tend to remain water wet while the oil wet particles in the liquid hydrocarbon tend to remain oil wet thus preventing an imbalance of too great an amount of solids in the oil phase or too great an amount of solids in the aqueous phase. An imbalance in either direction will tend to increase the solids to liquid ratio to such an extent that an immobile mass is produced. The composition of this invention prevents such an imbalance to occur. For any combination of specific surfactants the weight ratio which is preferred to provide the necessary balance can be readily determined by simple laboratory procedures such as disclosed in the specific working examples included hereinafter.

Optionally, a dispersant is employed in the spacer composition when dry cement is employed as the weighing agent to reduce the apparent viscosity of the system to be used in well cementing. A suitable dispersant to use is the condensation product of mono-naphthalene-sulfonic acid and formaldehyde or the alkali metal salt thereof. The dispersant may also contain an antifoaming agent or antifoamer. The condensation product wherein the sodium salt employed has the probable structural formula set out below:

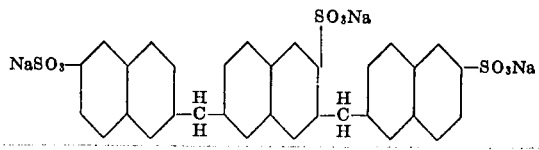

The formula may also be expressed:

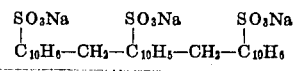

Properties and specifications of the above-condensation product, of significance are:

| | |
|---|---|
| appearance | fine, light tan powder |
| active matter content | 87% |
| inert matter content (Na$_2$SO$_4$) | 5 to 7% |
| ash | 31 to 32% |
| moisture | 5% |
| solubility | freely in hard or soft water |
| solution, color | clear-light amber |
| foam producing tendency | nil |
| effect on surface tension | nil |
| pH of 10% aqueous solution | 9 to 9.5 |
| viscosity of 30% aqueous solution at 25°C | 6 centipoises |
| viscosity of 35% aqueous solution at 25°C | 7 centiposies |

The condensation product is employed in an amount between about 0.01 percent and about 20.0 percent, based upon the dry weight of the cement employed in the spacer composition. More than about 10.0 percent of the dispersant is not warranted. The preferred amount to employ is between about 0.1 percent and about 1.5 percent. The antifoaming agent, when employed, may be any of the known agents which, when admixed with an aqueous solution or slurry lowers the surface tension and thereby lessens the tendency to foam. However, the preferred anti-foaming agents to employ in the invention are polyoxyalkylene glycols having a molecular weight between about 1000 and 6000, and more preferably polyoxypropylene glycol having a molecular weight between about 2000 and 4000. The anti-foaming agent, when desired, is usually employed in an amount between about 0.001 percent and 0.10 percent, based on the dry weight of the cement.

Optionally, a suspending agent is employed in the composition. Such an agent is preferably employed when the surfactants are not readily dispersible or soluble in the hydrocarbon base and when solid particulate weighting agents are employed. Sufficient agitation of the spacer composition may be employed alone or in conjunction with a suspending agent to maintain the solid constituents in suspension. Any suspending agent which can improve the suspending properties of the hydrocarbon base can be employed. Illustrative of such suspending agents are tall oil, certain aluminum soaps, aluminum soaps of phosphate esters such as, for example, those disclosed in U.S. Pat. Nos. 2,983,678; 2,983,679; 3,494,949; 3,505,374 and the like. The suspending agent should be compatible with the other constituents of the composition, with aqueous fluids, e.g., cement slurries, and various other fluids which will come in contact with the composition such as aqueous and hydrocarbon based drilling muds.

Optionally, a weighting agent can be employed in the composition. When the composition is to be employed as a spacer between cement slurries and drilling muds, it is usually preferable, but not absolutely necessary, to have the density of the composition at least equal to or greater than about the density of both the aqueous cement slurry and the drilling mud which is to be removed from the borehole. Weighting agents which can be employed are particulate substantially water and liquid hydrocarbon insoluble solids including, for example, sand, barite, fly ash, hematite, other finely ground solids, dry cements and the like. When the composition is employed in a cement slurry environment, preferably the weighting agent comprises the dry cement which is employed in the aqueous cement slurry, for example, Portland cement blends and the like.

The constituents of the composition can be present in the following ranges:

|  | percent by Weight |
|---|---|
| Liquid Hydrocarbon | about 70 to about 97 |
| Water Wetting Surfactant | about 1.5 to about 15 |
| Oil Wetting Surfactant | about 1.5 to about 15 |

In addition, the amount of suspending agent which is used will depend on many factors, e.g., environment, temperature, specific suspending agent(s) employed, viscosity restrictions, weighting agents employed and the like. Some suspending agents are very effective at very low concentrations while others need to be employed in larger amounts.

The weighting agent is employed in any desired amount to provide an effective composition density.

The composition may be prepared in any suitable mixer, preferably a short period before its intended use. For example, a liquid hydrocarbon, a water wetting surfactant, an oil wetting surfactant, a weighting agent and a suspending agent may be all added to a blender and then agitated for a sufficient period of time to adequately mix the constituents.

The composition of the present invention is compatible with solid containing hydrocarbon based and water based compositions, e.g., oil and water based drilling muds, cement slurries, liquid hydrocarbons, brines and the like, and is stable at elevated temperatures. The density of the composition can be easily altered and the suspending characteristic of the composition is excellent even at high temperatures. The latter property prevents solids and other weighting materials from settling out and causing undesirable bridging or other obstruction to the flow of fluids through a conduit, displacing equipment and the like.

EXAMPLE 1

Thickening time tests were conducted to evaluate the high temprature stability of the spacer composition and also to determine its effect on the reaction rate or setting time of a high temperature cementing composition. The cement system was designed to remain thin and pumpable for at least 3 hours. 3 hours is sufficient time to mix and displace a cement slurry to the desired position in the annulus of a deep borehole.

In order to determine the effect of an oil based drilling mud, a composition of the invention and various combinations thereof, on the setting time of a cement slurry, the following test was run. The thickening time of the various systems was determined according to the procedure prescribed in API RP 10B, Section 10, Schedule 11, 1967, at a temperature of 340°F. The thickening time is the time required for a cement slurry of a given composition to reach a consistency of 100 poise as determined by the method prescribed in API RP 10B.

The cement slurry comprised, as parts by weight, Class H cement —94; sand —33; retardant —1.7; dispersant 0.5; weighting agent, finely divided hematite 14; and 4.45 gallons of water per 94 lbs. of cement. The cement slurry weighed 18 lbs. per gallon.

The composition of the present invention (referred to as spacer in the following tables) comprised the same dry cement as a weighting agent as described for the above cement slurry, mixed with 3.75 gallons of the liquid portion of the spacer per 94 pounds of cement to form an 18 pound per gallon spacer slurry. The liquid portion of the spacer, as parts by volume, comprised No. 2 diesel oil 3.34; a suspending agent comprising a phosphate ester aluminum soap 0.13; an activator 0.02; oil wetting surfactant 0.13, comprising a fatty polyamide; and a water wetting surfactant 0.13 comprising an amphoteric water-soluble oxyethylated sodium salt.

These tests were conducted with an oil-based drilling mud containing asphalt and barite as a weighting agent, a commonly used oil base drilling mud which exhibits unusually severe gelation properties when mixed with aqueous cement slurries.

These thickening time tests indicate that the cement slurry will remain thin and pumpable for at least 3 hours. The gelation properties of the drilling mud are illustrated by this data, in that a 50:50 and even an 80:20 mixture were too thick to test. The heat stability of the spacer system and a mixture of spacer and oil base mud is illustrated by the fact that they remained thin and pumpable for a length of time which is sufficient to mix and displace them to the desired position in the borehole. The three mixtures of spacer and cement indicate the spacer will extend the thickening time of a mixture of cement slurry and spacer in proportion to the concentration of spacer. The results of the thickening time test performed with a mixture of one third each, cement slurry, spacer slurry, and oil base mud indicates the spacer will keep a mixture of cement and oil base mud from gelling for sufficient time to mix and displace the cement slurry to the desired position in the borehole.

The thickening times for the cement and the cement mixed with the composition of the present invention, the oil-based mud and various combinations thereof are set forth in the following Table I.

TABLE I

| Composition — Parts by Weight | | Thickening Time Hr.:Min. |
|---|---|---|
| Cement | 100 | 3:01 |
| Cement:Mud | 50:50 | 0:00 |
| Cement:Mud | 80:20 | 0:00 |
| Cement:Spacer | 50:50 | 4:00 |
| Cement:Spacer | 80:20 | 3:02 |
| Cement:Spacer | 20:80 | >5:00* |
| Cement:Spacer:Mud | 33⅓:33⅓: 33⅓ | >5:00 |
| Spacer:Mud | 50:50 | >5:00 |
| Spacer | 100 | >5:00 |

* >5:00 — The slurry had not started to thicken at 5 hours.

EXAMPLE 2

In this example, tests were run to demonstrate the mud removal properties of the composition of the present invention. In the test, sections of pipe were coated with the oil-based mud described in Example 1 and then the pipe was circulated with a like amount of cement slurry, a spacer composition, and/or a spacer composition cement slurry mixture. The cement slurry and spacer compositions were the same as employed in Example 1. The pipes were then cemented in molds and cured at a temperature of 380°F. for 24 hours under a pressure of 3,000 p.s.i.

The force required to break the pipe from the set cement was measured. The results of the tests are set forth in the following Table II.

TABLE II

| Pipe Treatment | Shear Bond (p.s.i.) |
|---|---|
| Bare Pipe — control | 2184 |
| Pipe coated with mud — no wash | 0 |
| Pipe coated with mud and circulated with cement slurry | 400 |
| Pipe coated with mud and circulated with spacer | 835 |
| Pipe coated with mud, circulated with spacer and then cement | 2286 |

EXAMPLE 3

Viscosity tests were run on various mixtures of the cement slurry, spacer and oil based mud described in Example 1. Relative viscosities were measured employing a Marsh funnel, API RP29 (May, 1950). The time for 1,000 mls. of the various mixtures to flow through the funnel is reported in the following Table III.

TABLE III

| Composition — Parts by Weight | | Time for 1000 mls. to Flow in Minutes:Seconds |
|---|---|---|
| Cement Slurry:Mud | 50:50 | Too viscous to flow through funnel |
| Cement Slurry:Mud:Spacer | 33⅓:33⅓:33⅓ | 11:20 |
| Mud:Spacer | 50:50 | 10:48 |

EXAMPLE 4

In this example, the compressive strength of a set cement slurry, and set cement slurries containing various amounts of an oil-base mud, water-base mud or the spacer was determined. The samples were mixed and cured for 24 hours at 380°F. and 3,000 p.s.i. Compressive strengths were determined employing a hydraulic press. The water-based mud contained bentonite and barite.

The results of these tests are set forth in the following Table IV wherein each of the spacer, oil-base mud and water-base mud is shown as percent by weight of each of the cement slurry-constituent mixture.

TABLE IV

| % Spacer | % Oil Base Mud | % Water Base Mud | Compressive Strength (p.s.i.) |
|---|---|---|---|
| 0 | 0 | 0 | (Blank, cement only) 6348 |
| 10 | 0 | 0 | 6334 |
| 0 | 10 | 0 | 2738 |
| 0 | 0 | 10 | 5549 |
| 20 | 0 | 0 | 2950 |
| 0 | 20 | 0 | 650 |
| 0 | 0 | 20 | 1396 |
| 35 | 0 | 0 | 965 |
| 0 | 35 | 0 | 315 |
| 0 | 0 | 35 | Not set |
| 50 | 0 | 0 | 451 |
| 0 | 50 | 0 | 136 |
| 0 | 0 | 50 | Not set |

The above data show that oil base mud is most detrimental to the set strength of cement when present at low concentrations; but at higher concentrations water base mud contamination is most harmful. At all concentrations the cement spacer composition is least detrimental of these three contaminant mixtures.

EXAMPLE 5

In this example tests were run according to that described in Example 4 except that both the spacer and the oil or water-based mud were mixed with the cement slurry. The results of these tests are set forth in the following Table V.

TABLE V

| % Spacer | % Oil Base Mud | % Water Base Mud | Compressive Strength (p.s.i.) |
|---|---|---|---|
| 0 | 0 | 0 | (Blank, cement only) 5019 |
| 5 | 5 | 0 | 3288 |
| 5 | 0 | 5 | 4168 |
| 10 | 10 | 0 | 895 |
| 10 | 0 | 10 | 3563 |
| 25 | 25 | 0 | Not Set |
| 25 | 0 | 25 | 320 |

In brief, the data in Table V show that cement slurry contaminated with a mixture of the spacer composition and either an oil base mud or a water base mud will set to give an early compressive strength.

EXAMPLE 6

In this example a field job using the oil base mud spacer was conducted. A 6000 ft. liner was set to a total depth of 18,700 feet. A 13 lb./gal. invert emulsion mud was used for drilling. The liner was 7⅝ inches set in 8½ inches open hole. The job was designed to bring cement back 3000' off bottom. The cement system was Class H containing 35 percent by weight of sand, 18 percent sodium chloride, 0.5 percent of the sodium salt of the condensation product of mono-napthalene-sulfonic acid and formaldehyde, and 0.7 percent of a 1:1 mixture of sodium glucoheptonate:lignin amine derivative (more fully described in U.S. Pat. No. 3,234,154). 10 Barrels of the composition of the present invention were used. The composition was similar to that taught in the previous examples. This amount of spacer required 41 sacks of cement blend and 203 gallons of spacer fluid. Diesel fuel was hauled to location in a paddle mixer. The additives were added on location. Cement was blown into the bottom of the mixer while the paddles were turning. A mud cup was used to determine when a spacer slurry weight of 16.3 lbs./gal. was achieved. No problems were encountered mixing the slurry in this manner. The 10 barrels of spacer slurry were pumped ahead of the cement. No problems occurred during the mixing, pumping and displacement of the spacer slurry or cement slurry as indicated by a pressure history which showed no undesirable gelation occurred during the displacement of the cement slurry.

What is claimed is:

1. In a method of emplacing an aqueous hydraulic cement slurry into a well bore which contains an oil base composition having dispersed therein oil wet particles, wherein a spacer composition is introduced into the well prior to said cement slurry to displace said oil base composition from the area of the well bore where the cement slurry is to be emplaced, the improvement which comprises: introducing a spacer composition comprising as per cent by weight, a liquid hydrocarbon from about 70 to about 97 per cent; an oil wetting surfactant which tends to maintain oil wet solids entering the spacer fluid in an oil wet condition; from about 1.5 to about 15 per cent; and a water wetting surfactant which tends to maintain water wet solids entering the spacer composition in a water wet condition, from about 1.5 to about 15 per cent.

2. The method of claim 1 wherein said spacer composition includes in addition a particulate weighting agent in an amount which is sufficient to provide a density of said spacer composition which is at least as great as the greater of the densities of said drilling mud and said cement slurry.

3. A method of cementing an area of a well bore with an aqueous hydraulic cement slurry containing water wet solids, said well bore containing in said area to be cemented an oil base drilling mud having dispersed therein oil wet solids, which comprises:
   a. introducing into said borehole and into contact with said drilling mud a spacer composition comprising, as per cent by weight, a liquid hydrocarbon, from about 70 to about 97 per cent; an oil wetting surfactant which tends to maintain oil wet solids of said mud when entering said spacer composition in an oil wet condition, from about 1.5 to about 15 per cent; a water wetting surfactant which tends to maintain water wet solids from said hydraulic cement slurry entering said spacer composition in a water wet condition; and a weighting agent suspended in said spacer composition,
   b. forcing said drilling mud from said area to be cemented with said spacer composition,
   c. forcing said spacer composition from said area to be cemented with said cement slurry, and
   d. permitting said cement slurry to set up in said area.

4. The method of claim 3 wherein the weighting agent is present in an amount which is sufficient to increase the density of the spacer composition to a value which is at least equal to or greater than the greater value of the density of said cement slurry and said drilling mud.

5. The method of claim 3 wherein said weighting agent consists of solid cement solids which correspond to the solid cement particles of said cement slurry.

6. The method of claim 3 wherein said flowable composition includes in addition a weighing agent comprising particulate cement and a dispersant for said cement in said flowable composition.

* * * * *